Figure 1:
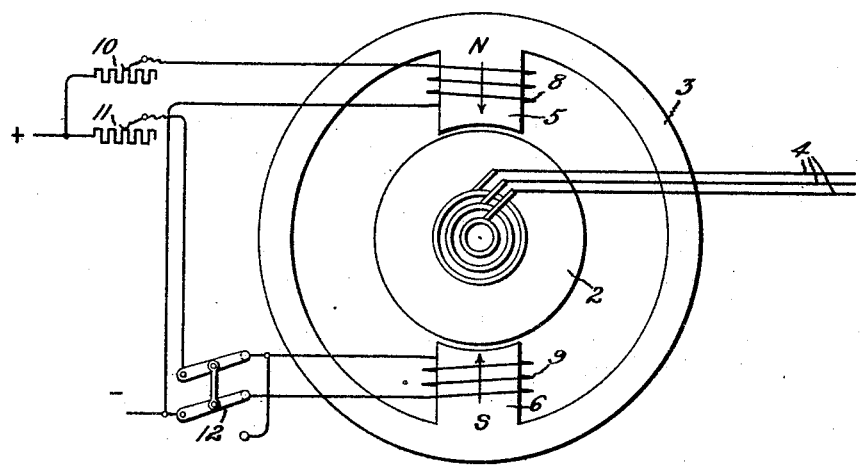

May 4, 1926.

W. WEILER 1,583,632

VOLTAGE REGULATING SYSTEM

Filed April 27, 1923

Charging Current

Inventor:
Wilhelm Weiler,
by
His Attorney.

Patented May 4, 1926.

UNITED STATES PATENT OFFICE.

1,583,632

WILHELM WEILER, OF NIEDERSCHONHAUSEN, GERMANY, ASSIGNOR TO GENERAL ELECTRIC COMPANY, A CORPORATION OF NEW YORK.

VOLTAGE-REGULATING SYSTEM.

Application filed April 27, 1923. Serial No. 635,023.

*To all whom it may concern:*

Be it known that I, WILHELM WEILER, a citizen of the German Realm, residing at Niederschonhausen, Germany, have invented certain new and useful Improvements in Voltage-Regulating Systems, of which the following is a specification.

My invention relates to voltage regulating systems and particularly to a voltage regulating system for an alternating current synchronous generator which is adapted to supply under certain conditions a highly capacitive load, for example a generator which is adapted to supply current to a transmission line.

When an alternating current generator is connected to a long transmission line which is either without load or but slightly loaded, the generator voltage builds up to an abnormal value due to the fact that the charging or capacity current of the line is magnetizing. This action is so pronounced with long lines that it is impossible to reduce the voltage to normal by controlling the generator excitation in the ordinary manner since the abnormal conditions will obtain even if the separate generator excitation is reduced to zero.

One object of my invention is to provide an arrangement for regulating the voltage of an alternating current synchronous generator, which due to the character of the load connected to the generator and the normal magnetic characteristic of the generator, cannot be regulated by the ordinary method of field control.

In accordance with the preferred embodiment of my invention I provide means for changing the magnetic characteristic of the generator by varying the saturation of certain parts of the magnetic circuits. This may be accomplished by exciting the field poles of the generator in such a manner that the flux in one of each pair of poles is increased and the flux in the other pole of each pair of poles is decreased. For example, assuming a two pole machine, a winding is provided on one of the poles and is excited in such a manner that the magnetomotive force produced by the current in this winding produces a flux in the same direction as the flux produced by the armature current, and a winding is provided on the other one of the pair of poles and is excited in such a manner that the magnetomotive force produced by the current in this winding tends to set up a flux in the opposite direction to the flux produced in the pole by the armature current. Therefore, the flux in the first mentioned pole is increased so that this portion of the magnetic structure becomes saturated before the remainder of the magnetic circuit whereas some of the field flux is crowded out of the second mentioned pole due to the opposing magnetomotive forces and has to go through the air surrounding the pole instead of through the pole so that flux in this portion of the magnetic structure is decreased. In view of the fact that the reluctance of iron and similar material increases at a greater rate, for a given change in the exciting current, when the material is saturated than when the material is being worked on the straight portion of its magnetization curve, it is evident that by increasing the energization of the winding which sets up a flux in the same direction as the armature current, the reluctance of the entire magnetic circuit increases at a greater rate after the pole, on which the winding is wound, becomes saturated. Furthermore, the reluctance of the entire magnetic circuit is increased due to the fact that some of the field flux is forced out into the air by the opposing magnetomotive force produced by the winding on the second mentioned pole. Therefore it is evident that by varying the currents through the windings the reluctance of the entire magnetic circuit may be changed, consequently the magnetic characteristics of the generator may be changed in such a manner that the voltage of the generator may be readily controlled under all conditions of load. Preferably the ampere turns of the coils on each pair of poles are made when the load conditions are such that armature current produces sufficient flux to excite the generator so that the magnetomotive forces of the two coils, which oppose each other are equal and no additional flux is produced thereby. Means are provided, however, so that magnitude and direction of the current through the coil, which under no load conditions produce a magnetomotive force in opposition to the magnetomotive force produced by the armature current, may be varied with respect to the current in the other coil so that voltage of the generator may be maintained at its normal value as the load increases.

My invention will be better understood from the following description taken in connection with the accompanying drawing and its scope will be pointed out in the appended claims.

Figure 2:
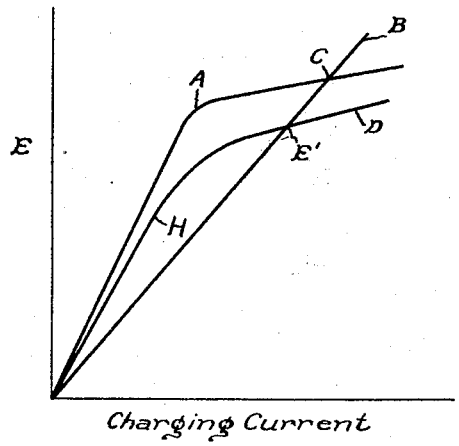

Fig. 1 of the accompanying drawing is a diagrammatic view of one embodiment of my invention and Fig. 2 is an explanatory diagram.

Referring to Fig. 1, the polyphase generator 1, which is provided with an armature 2 and a field structure 3, supplied current to a circuit 4 which, it will be assumed, is a long transmission line. When no-load is connected to the line, the generator supplies a charging current which leads the generator voltage and which produces a flux in the field structure 3. Let it be assumed that this flux is in such a direction that the pole 5 is a north pole and the pole 6 is a south pole. It is well known in the art that the excitation produced by the charging current alone causes the generator to build up its voltage to a value which depends upon the characteristics of the line 4 and the saturation curve of the generator. Usually, under no-load and light load conditions, this voltage is considerably above the normal operating voltage so that it is desirable to be able to regulate this voltage in some way. I accomplish this result by providing means whereby the reluctance of certain portions of the magnetic current of the generator may be changed. In accordance with the preferred embodiment of my invention this is accomplished by winding on certain parts of the field structure two coils 8 and 9, which are connected and arranged so that they produce opposing magnetomotive forces. As shown the coil 8 is wound on the pole 5 and is connected to a suitable source of current in such a manner that the current through the coil sets up a magnetomotive force which tends to produce a flux in the field structure 3 in the same direction as the flux produced by the armature current. The coil 9 is wound on the pole 6 and is connected to a suitable source of current in such a manner that the current through the coil produces a magnetomotive force which tends to produce a flux in the field structure in the opposite direction to the flux produced by the armature current. Since the magnetomotive forces produced by the currents in the two coils are opposed to each other, the amount of flux produced in entire field structure by the two coils depends upon the relative ampere turns. In order to vary the ampere turns of the coils 8 and 9, adjustable rheostats 10 and 11 are provided in the respective circuits of these coils. A suitable reversing switch 12 is also provided in the circuit of the coil 9 so that current through this winding can be reversed for a purpose hereinafter described.

It is believed that my invention may be better understood from the curves shown in Fig. 2. In this diagram the curve A is the magnetic characteristic or saturation curve of the generator with both of the windings 8 and 9 de-energized and the generator entirely excited by the charging current. The curve B is the impedance drop characteristic of the circuit connected to the generator. Under the conditions assumed the generator voltage builds up to a value C where the two curves A and B intersect. If $E^1$ is normal voltage it is apparent that generator voltage cannot be reduced to this value by decreasing the separate excitation of the generator because this excitation is already zero. Furthermore, since the line constants are fixed and the speed of the machine is constant it is apparent that neither of them can be changed to lower the voltage. If, however, means can be provided whereby the magnetic characteristic of the machine can be changed in such a manner that it intersects the impedance drop characteristic curve B at normal voltage $E^1$, we have an arrangement for controlling the voltage of the generator. By means of the windings 8 and 9 arranged in the manner shown in Fig. 1, I am able to change the magnetic characteristic from the curve A to a curve similar to D which intersects the curve B at the normal voltage $E^1$. The change in the slope of straight portion of the curve D is caused by the winding 9 since the opposing magnetomotive force produced by the current through this winding produces an effect similar to an increase in the air gap. The winding 8 is the cause for the curve D starting to bend before the curve A. When the winding 8 is energized the pole 5 is saturated by a smaller amount of flux produced by the armature current than when the winding 8 is not energized. Therefore the pole 5 becomes saturated before the remainder of the magnetic current. As pole 5 becomes saturated the reluctance of the field structure increases so that a greater change in the armature current, which excites the generator, is required to produce a given change in the voltage. Consequently a bend is produced in the magnetic characteristic of the generator at the point H where the pole 5 begins to become saturated.

It is evident that by varying the currents in the windings 8 and 9 the slope of the curve D and the point H, where the bending begins, may be adjusted so as to change the voltage at which the curve intersects the curve B. Preferably however, the currents through the two windings are so adjusted, when the armature current is such that the flux produced thereby is sufficient to excite the generator, that the ampere turns of the two windings are equal so that the magnetomotive forces produced by the current through the two windings are equal, and therefore no flux circulates through the entire magnetic structure due to the energization of these two windings.

As load is connected to the transmission circuit in the arrangement shown in Fig. 1, the leading power factor decreases so that the excitation produced by the armature current decreases. Therefore, in order to maintain the voltage at its normal value it is necessary to excite the field structure from some external source. This additional excitation may be readily obtained in the arrangement shown by varying the rheostat 11 so as to decrease the current through the winding 9 so that the magnetomotive forces produced by the two windings 8 and 9 are unequal and the resultant magnetomotive force produces a flux which circulates through the field structure in the same direction as the flux produced by the leading armature current.

When the circuit through the winding 9 has been reduced to zero, further regulation of the generator voltage may be obtained by reversing the connections of the winding 9 by means of the reversing switch 12 and then increasing the current through the winding 9 by means of the rheostat 11, the current through the winding 9 now producing a flux in the field structure in the same direction as the flux produced by the winding 8. It is apparent that as the excitation of the winding 9 is changed in this manner, the shape of the magnetic characteristic is changed from a curve similar to D to a curve similar to A.

From the above description it will be evident that when the load conditions of the circuit connected to the generator are such that the armature current alone excites the generator in such a manner as to produce an abnormal voltage, I regulate the voltage by varying the reluctance of certain parts of the field structure so as to change the magnetic characteristic of the generator. When, however, the load conditions change so that the armature current alone does not produce the necessary excitation, I provide the necessary additional excitation by separately exciting the field structure and regulate the voltage in the usual way, namely, by varying the amount of separate excitation.

While I have shown a two pole three phase generator it is evident that my invention is applicable to an alternating current generator of any number of poles and phases, and that it is not limited to the particular type of machine shown.

While I have shown and described only one embodiment of my invention I do not desire to be limited thereto but seek to cover in the appended claims all those modifications which fall within the true spirit and scope of the appended claims.

What I claim as new and desire to secure by Letters Patent of the United States, is:—

1. A regulating system for an alternating current synchronous generator which is adapted to supply a load of such a character that the excitation produced by the armature current is sufficient to cause the voltage of the generator to build up to an abnormal value, characterized by the fact that means are provided for varying the reluctance of the magnetic structure of the generator whereby the amount of flux produced by a given amount of armature current may be varied to regulate the voltage of said generator.

2. A regulating system for an alternating current synchronous generator which is adapted to supply a load of such a character that the excitation produced by the armature current is sufficient to cause the generator voltage to build up to an abnormal value, characterized by the fact that means are provided for varying the saturation of a certain portion of the magnetic structure of the generator whereby the amount of flux produced by a given amount of armature current may be varied to regulate the voltage of said generator.

3. A regulating system for an alternating current synchronous generator which is adapted to supply a load of such a character that the excitation produced by the armature current is sufficient to cause the generator voltage to build up to an abnormal value, characterized by the fact that means are provided for varying a magnetomotive force having such a direction as to set up a flux in the field structure of the generator in the same direction as the flux produced by the armature current in a certain portion of the field structure of said generator and a magnetomotive force of the opposite direction in another portion of the field structure, said means being arranged so that the magnetomotive forces may be varied with respect to each other.

4. A regulating system for an alternating current synchronous generator which is adapted to supply current to a transmission line under varying conditions of load, characterized by the fact that means are provided whereby a magnetomotive force may be produced in one of the field poles of the generator so as to produce in said pole a flux in the same direction as the flux produced therein by the charging current supplied to the line, means are provided whereby a magnetomotive force may be produced in another one of the field poles of the generator so as to produce in said last mentioned pole a magnetomotive force equal to said first mentioned magnetomotive force but opposite in direction to the flux produced in said last mentioned pole by the charging current, and means are provided whereby the magnitude of each one of said opposing magnetomotive forces may be varied.

5. A regulating system for an alternating current synchronous generator which is adapted to supply current to a transmission line under varying conditions of load, characterized by the fact that means are provided whereby a magnetomotive force may be produced in one of the field poles of the generator so as to produce in said pole a flux in the same direction as the flux produced therein by the charging current supplied to the line, means are provided whereby a magnetomotive force may be produced in another one of the field poles of the generator so as to produce in said last mentioned pole a magnetomotive force equal to said first mentioned magnetomotive force but opposite in direction to the flux produced in said last mentioned pole by the charging current, and means are provided whereby the relative magnitudes of said magnetomotive forces may be varied.

6. A regulating system for an alternating current synchronous generator which is adapted to supply current to a transmission line under varying conditions of load, characterized by the fact that means are provided whereby a magnetomotive force may be produced in one of the field poles of the generator so as to produce in said pole a flux in the same direction as the flux produced therein by the charging current supplied to the line, means are provided whereby a magnetomotive force may be produced in another one of the field poles of the generator so as to produce in said last mentioned pole a magnetomotive force equal to said first mentioned magnetomotive force but opposite in direction to the flux produced in said last mentioned pole by the charging current, and means are provided whereby the magnitude and direction of one of said magnetomotive forces may be varied with respect to the other magnetomotive force.

7. In a voltage regulating system for an alternating current synchronous generator which is adapted to supply a load of such a character that the excitation produced by the armature current is sufficient to cause the voltage of the generator to build up to an abnormal value, the combination of a plurality of windings on the field structure of said generator connected and arranged so that the reluctance of the magnetic structure of the generator may be controlled by varying the current through the windings with substantially no additional flux being produced in the magnetic structure by said windings, and means for varying the current through each one of said windings.

8. In a voltage regulating system for an alternating current synchronous generator which is adapted to supply a load of such a character that the excitation produced by the armature current is sufficient to cause the voltage of the generator to build up to an abnormal value, the combination of a winding on one of the poles of said generator arranged so that the current through said winding produces a flux which is in the same direction as the flux produced in said pole by the armature current, a winding on another one of the poles of said generator arranged so that the current through said last mentioned winding tends to produce a flux in said other one of said poles in opposition to the flux produced by the armature current, and means for controlling the currents through said windings so that magnetomotive forces produced by the currents through said windings are equal.

In witness whereof, I have hereunto set my hand this 10th day of April, 1923.

WILHELM WEILER.